United States Patent
Horikawa et al.

(10) Patent No.: US 7,947,399 B2
(45) Date of Patent: May 24, 2011

(54) NON-AQUEOUS ELECTROLYTE FOR BATTERY AND NON-AQUEOUS ELECTROLYTE BATTERY COMPRISING THE SAME

(75) Inventors: Yasuo Horikawa, Kodaira (JP); Shinichi Eguchi, Kawasaki (JP); Masashi Ohtsuki, Koganei (JP)

(73) Assignee: Bridgestone Corporation, Tokyo (JP)

( * ) Notice: Subject to any disclaimer, the term of this patent is extended or adjusted under 35 U.S.C. 154(b) by 1224 days.

(21) Appl. No.: 11/578,602

(22) PCT Filed: Mar. 29, 2005

(86) PCT No.: PCT/JP2005/005920
§ 371 (c)(1), (2), (4) Date: Oct. 16, 2006

(87) PCT Pub. No.: WO2005/104289
PCT Pub. Date: Nov. 3, 2005

(65) Prior Publication Data
US 2007/0202417 A1 Aug. 30, 2007

(30) Foreign Application Priority Data

Apr. 19, 2004 (JP) ................................. 2004-122959
Oct. 5, 2004 (JP) ................................. 2004-292668

(51) Int. Cl.
*H01M 6/04* (2006.01)
(52) U.S. Cl. .................. 429/345; 429/336; 429/326
(58) Field of Classification Search .................. 429/29, 429/46, 336, 326, 345; *H01M 6/14, 10/05*
See application file for complete search history.

(56) References Cited

FOREIGN PATENT DOCUMENTS

| | | | |
|---|---|---|---|
| EP | 1 204 157 | A | 5/2002 |
| JP | 4-184870 | A | 7/1992 |
| JP | 8-22839 | A | 1/1996 |
| JP | 10/255839 | A | 9/1998 |
| JP | 11-233141 | A | 8/1999 |
| JP | 2000-182669 | A | 6/2000 |
| JP | 2001-068153 | A | 3/2001 |
| JP | 2002-198090 | A | 7/2002 |
| JP | 2002-231309 | A | 8/2002 |
| JP | 2004-119260 | A | 4/2004 |
| JP | 2004-296117 | A | 10/2004 |
| JP | 2004-363077 | A | 12/2004 |

OTHER PUBLICATIONS

Kawamura et al. "Thermal stability of alkyl carbonate mixed-solvent electrolytes for lithium ion cells" published in Journal of Power Sources 104 (2002) 260-264.*
C. Nanjundiah, et al., "Cyclic voltammetric analysis of organophosphorous esters", Journal of the Electrochemical Society, vol. 133, No. 5, Jan. 1, 1986, pp. 955-958, XP002319390.

* cited by examiner

*Primary Examiner* — Jennifer K. Michener
*Assistant Examiner* — Heng M Chan
(74) *Attorney, Agent, or Firm* — Sughrue Mion, PLLC

(57) ABSTRACT

This invention relates to a non-aqueous electrolyte for a battery having an excellent safety and a non-aqueous electrolyte battery comprising such a non-aqueous electrolyte and having a high safety, and more particularly to a non-aqueous electrolyte for a battery comprising a phosphine oxide compound having P—F bond and/or P—$NH_2$ bond in its molecule and a support salt, as well as a non-aqueous electrolyte battery comprising such a non-aqueous electrolyte for the battery, a positive electrode and a negative electrode.

10 Claims, No Drawings

NON-AQUEOUS ELECTROLYTE FOR BATTERY AND NON-AQUEOUS ELECTROLYTE BATTERY COMPRISING THE SAME

TECHNICAL FIELD

This invention relates to a non-aqueous electrolyte for a battery and a non-aqueous electrolyte battery comprising the same, and more particularly to a non-aqueous electrolyte for a battery being excellent in the safety and a non-aqueous electrolyte battery.

BACKGROUND ART

Recently, batteries having a light weight, a long service life and a high energy density are demanded as a main power source or an auxiliary power source for electric automobiles and fuel cell vehicles, or as a power source for small-size electronics devices. For this demand, a non-aqueous electrolyte battery using lithium as an active substance for a negative electrode is known as one of the batteries having a high energy density because an electrode potential of lithium is lowest among metals and an electric capacity per unit volume is large, and many kinds of such a battery are actively studied irrespectively of primary battery and secondary battery, and a part thereof is practiced and supplied to markets. For example, the non-aqueous electrolyte primary batteries are used as a power source for cameras, electronic watches and various memory backups. Also, the non-aqueous electrolyte secondary batteries are used as a driving power source for note-type personal computers, mobile phones and the like, and further they are investigated to use as the main power source or the auxiliary power source for the electric automobiles and the fuel cell vehicles.

In these non-aqueous electrolyte batteries, since lithium as an active substance for a negative electrode violently reacts with a compound having an active proton such as water, alcohol or the like, the electrolyte used in these batteries is limited to an aprotic organic solvent such as ester compound, ether compound or the like.

Although the aprotic organic solvent is low in the reactivity with lithium as the active substance for the negative electrode, there is a high risk that if a large current flows violently, for example, in the short-circuiting or the like to cause the abnormal heat generation in the battery, the aprotic organic solvent is vaporized and decomposed to generate a gas, or the generated gas and heat cause explosion and ignition of the battery, or fire is caught by a spark generated in the short-circuiting or the like.

As to such a problem, there is studied a method for rendering the non-aqueous electrolyte for the battery flame retardant. For example, there are reported a method of using phosphates such as trimethyl phosphate or the like as an electrolyte and a method of adding a phosphate to the aprotic organic solvent (see JP-A-H04-184870, JP-A-H08-22839, JP-A-2001-182669 and the like). However, these usual triesters of phosphoric acid do not have sufficient non-combustibility, and are gradually and reductively decomposed on the negative electrode by repeating discharge-recharges, so that there is a problem that performances of the battery such as a cycle performance and so on are highly deteriorated.

DISCLOSURE OF THE INVENTION

It is, therefore, an object of the invention to provide a non-aqueous electrolyte for a battery having an excellent safety by adding a compound having an excellent combustion inhibiting effect and a non-aqueous electrolyte battery comprising the non-aqueous electrolyte and having a high safety.

The inventors have made studies on various phosphine oxide compounds and discovered that there are compounds having particularly an excellent combustion inhibiting effect and the safeties of the non-aqueous electrolyte and the non-aqueous electrolyte battery can be improved by adding such a compound to the non-aqueous electrolyte, and as a result the invention has been accomplished.

That is, the non-aqueous electrolyte for the battery according to the invention is characterized by comprising a phosphine oxide compound having P—F bond and/or P—NH$_2$ bond in its molecule and a support salt.

In a preferable embodiment of the non-aqueous electrolyte for the battery according to the invention, a content of the phosphine oxide compound is not less than 3% by volume, more preferably not less than 5% by volume.

In another preferable embodiment of the non-aqueous electrolyte for the battery according to the invention, the phosphine oxide compound is represented by the following formula (I):

$$O=PR^1{}_3 \qquad (I)$$

(wherein $R^1$s are independently a monovalent substituent or a halogen element, provided that at least one of $R^1$s is a fluorine or an amino group). More preferably, $R^1$s in the formula (I) are independently selected from the group consisting of fluorine, an amino group, an alkyl group and an alkoxy group, and at least one of $R^1$s is fluorine or amino group. Moreover, a phosphine oxide compound of the formula (I) wherein at least one of $R^1$s is fluorine and at least one of $R^1$s is amino group as well as a phosphine oxide compound of the formula (I) wherein at least two of $R^1$s are fluorine or amino group are particularly preferable.

The non-aqueous electrolyte for the battery according to the invention is preferable to further contain an aprotic organic solvent. As the aprotic organic solvent are preferable cyclic and chain ester compounds and chain ether compounds.

Also, the non-aqueous electrolyte battery according to the invention is characterized by comprising the above-described non-aqueous electrolyte for the battery, a positive electrode and a negative electrode.

According to the invention, there can be provided the non-aqueous electrolyte for the battery comprising a phosphine oxide compound having P—F bond and/or P—NH$_2$ bond in its molecule and largely suppressing the risk of igniting-firing. Furthermore, there can be provided the non-aqueous electrolyte battery comprising such a non-aqueous electrolyte and highly improving the safety.

BEST MODE FOR CARRYING OUT THE INVENTION

Non-Aqueous Electrolyte for Battery

The non-aqueous electrolyte for the battery of the invention will be described in detail below. The non-aqueous electrolyte for the battery according to the invention comprises a phosphine oxide compound having P—F bond and/or P—NH$_2$ bond in its molecule and a support salt, and may further contain an aprotic organic solvent and so on, if necessary. Since such a phosphine oxide compound is included in the non-aqueous electrolyte of the non-aqueous electrolyte battery of the invention, the risk of igniting-firing in the non-aqueous electrolyte and the battery comprising the non-aqueous electrolyte is highly suppressed.

The phosphine oxide compound used in the non-aqueous electrolyte for the battery of the invention is not particularly limited as far as it has P—F bond and/or P—$NH_2$ bond in its molecule. Among such phosphine oxide compounds, the phosphine oxide compound represented by the formula (I) is preferable. In the formula (I), $R^1$s are independently a monovalent substituent or a halogen element, and at least one of $R^1$s is fluorine or an amino group. As the halogen element are preferably mentioned fluorine, chlorine, bromine and the like. Among them, fluorine is particularly preferable. On the other hand, as the monovalent substituent are mentioned an amino group, an alkoxy group, an alkyl group, a carboxyl group, an acyl group, an aryl group and the like. Among them, the amino group and the alkoxy group are preferable in a point that the effect of decreasing the risk of igniting-firing the electrolyte is excellent. As the alkoxy group are mentioned methoxy group, ethoxy group, methoxy ethoxy group, propoxy group, phenoxy group and the like. As the alkyl group are mentioned methyl group, ethyl group, propyl group, butyl group, pentyl group and the like. As the acyl group are mentioned formyl group, acetyl group, propionyl group, butyryl group, isobutyryl group, valeryl group and the like. As the aryl group are mentioned phenyl group, tolyl group, naphthyl group and the like. In these monovalent substituents, a hydrogen element is preferable to be substituted with a halogen element. As the halogen element are preferably mentioned fluorine, chlorine, bromine and the like, and fluorine is most preferable and chlorine is second most preferable.

The phosphine oxide compound preferably has a halogen element content of not less than 10% by mass in the molecule, and more preferably has a halogen element content of not less than 15% by mass in the molecule. Moreover, the phosphine oxide compound preferably has a fluorine content of not less than 7% by mass in the molecule, and more preferably has a fluorine content of not less than 10% by mass in the molecule. The phosphine oxide compound having the halogen element content of not less than 10% by mass in the molecule is excellent in the effect of suppressing combustion of the non-aqueous electrolyte, and the phosphine oxide compound having the fluorine content of not less than 7% by mass in the molecule is particularly excellent in the effect of suppressing combustion of the non-aqueous electrolyte.

As the phosphine oxide compound are particularly preferable a phosphine oxide compound of the formula (I) wherein at least one of $R^1$s is fluorine and at least one of $R^1$s is amino group, and a phosphine oxide compound of the formula (I) wherein at least two of $R^1$s are fluorine or amino group. These phosphine oxide compounds have an excellent combustion inhibiting effect because a ratio of fluorine and amino group occupied in the molecule contributing to inhibit the combustion of the electrolyte is high.

As the phosphine oxide compound of the formula (I) are concretely mentioned trifluorophosphine oxide [O=$PF_3$], triaminophosphine oxide [O=$P(NH_2)_3$], aminodifluorophosphine oxide [O=$PF_2NH_2$], diaminofluorophosphine oxide [O=$PF(NH_2)_2$], methyl diaminophosphine oxide [O=$P(NH_2)_2CH_3$], methyl aminofluorophosphine oxide [O=$PF(NH_2)CH_3$], dimethoxy fluorophosphine oxide [O=$PF(OCH_3)_2$], ethoxy difluorophosphine oxide [O=$PF_2(OC_2H_5)$], methoxy difluorophosphine oxide [O=$PF_2(OCH_3)$], dimethyl fluorophosphine oxide [O=$PF(CH_3)_2$], diethoxy fluorophosphine oxide [O=$PF(OC_2H_5)_2$], methyl difluorophosphine oxide [O=$PF_2(CH_3)$] and the like.

The content of the phosphine oxide compound in the non-aqueous electrolyte is preferable to be not less than 3% by volume, and more preferable to be not less than 5% by volume. When the content of the phosphine oxide compound in the non-aqueous electrolyte is not less than 3% by volume, the risk of igniting-firing the non-aqueous electrolyte can be sufficiently suppressed. Moreover, these phosphine oxide compounds may be used alone or in a combination of two or more.

As the support salt used in the non-aqueous electrolyte for the battery of the invention is preferable a support salt serving as an ion source for a lithium ion. The support salt is not particularly limited, but preferably includes lithium salts such as $LiClO_4$, $LiBF_4$, $LiPF_6$, $LiCF_3SO_3$, $LiAsF_6$, $LiC_4F_9SO_3$, $Li(CF_3SO_2)_2N$, $Li(C_2F_5SO_2)_2N$ and so on. These support salts may be used alone or in a combination of two or more.

The concentration of the support salt in the non-aqueous electrolyte is preferably 0.2-1.5 mol/L (M), more preferably 0.5-1 mol/L (M). When the concentration of the support salt is less than 0.2 mol/L (M), the electric conductivity of the electrolyte cannot be sufficiently ensured and troubles may be caused in the discharge property and the charge property of the battery, while when it exceeds 1.5 mol/L (M), the viscosity of the electrolyte rises and the sufficient mobility of the lithium ion cannot be ensured, and hence the sufficient electric conductivity of the electrolyte cannot be ensured and troubles may be caused in the discharge property and the charge property of the battery likewise the above-mentioned case.

The aprotic organic solvent which may be used in the non-aqueous electrolyte of the invention does not react with the negative electrode and can control the viscosity of the electrolyte to a low level. As the aprotic organic solvent are concretely mentioned esters such as dimethyl carbonate (DMC), diethyl carbonate (DEC), diphenyl carbonate, ethyl methyl carbonate (EMC), ethylene carbonate (EC), propylene carbonate (PC), γ-butyrolactone (GBL), γ-valerolactone, methyl formate (MF) and so on; and ethers such as 1,2-dimethoxy ethane (DME), tetrahydrofuran (THF) and so on. Among them, propylene carbonate, 1,2-dimethoxy ethane and γ-butyrolactone are preferable as an aprotic organic solvent for the non-aqueous electrolyte of the primary battery, and ethylene carbonate, propylene carbonate, diethyl carbonate, dimethyl carbonate, ethyl methyl carbonate and methyl formate are preferable as an aprotic organic solvent for the non-aqueous electrolyte of the secondary battery. Moreover, cyclic esters are preferable in a point that the dielectric constant is high and the solubility of the support salt is excellent, while chain esters and chain ethers are preferable in a point that they has a low viscosity and the viscosity of the electrolyte is made low. These aprotic organic solvents may be used alone or in a combination of two or more.

<Non-Aqueous Electrolyte Battery>

Then, the non-aqueous electrolyte battery according to the invention will be described in detail. The non-aqueous electrolyte battery of the invention comprises the above-mentioned non-aqueous electrolyte for the battery, a positive electrode and a negative electrode, and may be provided with other members usually used in the technical field of the non-aqueous electrolyte battery such as a separator and the like, if necessary.

Active materials for the positive electrode in the non-aqueous electrolyte battery of the invention partly differ between the primary battery and the secondary battery. For example, as the active material for the positive electrode of the non-aqueous electrolyte primary battery are preferably mentioned graphite fluoride [$(CF_x)_n$], $MnO_2$ (which may be synthesized electrochemically or chemically), $V_2O_5$, $MoO_3$, $Ag_2CrO_4$, CuO, CuS, $FeS_2$, $SO_2$, $SOCl_2$, $TiS_2$ and the like. Among them, $MnO_2$ and graphite fluoride are preferable because they are high in the capacity and the safety, high in the discharge potential and excellent in the wettability to the electrolyte. These active materials for the positive electrode may be used alone or in a combination of two or more.

On the other hand, as the active material for the positive electrode of the non-aqueous electrolyte secondary battery are preferably mentioned metal oxides such as $V_2O_5$, $V_6O_{13}$, $MnO_2$, $MnO_3$ and the like; lithium-containing composite oxides such as $LiCoO_2$, $LiNiO_2$, $LiMn_2O_4$, $LiFeO_2$, $LiFePO_4$ and the like; metal sulfides such as $TiS_2$, $MoS_2$ and the like; electrically conductive polymers such as polyaniline and the like. The lithium-containing composite oxide may be a composite oxide containing two or three transition metals selected from the group consisting of Fe, Mn, Co and Ni. In this case, the composite oxide is represented by $LiFe_xCo_yNi_{(1-x-y)}O_2$ (wherein $0 \leq x<1, 0 \leq y<1, 0<x+y \leq 1$), $LiMn_xFe_yO_{(2-x-y)}$, $LiNi_xCo_yMn_{(1-x-y)}O_2$ or the like. Among them, $LiCoO_2$, $LiNiO_2$, $LiMn_2O_4$ and $LiNi_{1/3}Co_{1/3}Mn_{1/3}O_2$ are particularly preferable because they are high in the capacity, high in the safety and excellent in the wettability to the electrolyte. These active materials for the positive electrode may be used alone or in a combination of two or more.

Active materials for the negative electrode in the non-aqueous electrolyte battery of the invention partly differ between the primary battery and the secondary battery. For example, as the active material for the negative electrode of the non-aqueous electrolyte primary battery are mentioned lithium metal itself, lithium alloys and the like. As a metal to be alloyed with lithium are mentioned Sn, Si, Pb, Al, Au, Pt, In, Zn, Cd, Ag, Mg and the like. Among them, Al, Zn and Mg are preferable from a viewpoint of a greater amount of deposit and toxicity. These active materials for the negative electrode may be used alone or in a combination of two or more.

On the other hand, as the active material for the negative electrode of the non-aqueous electrolyte secondary battery are preferably mentioned lithium metal itself, an alloy of lithium with Al, In, Sn, Si, Pb, Zn or the like, a carbonaceous material such as graphite doped with lithium, and the like. Among them, the carbonaceous material such as graphite or the like is preferable and graphite is particularly preferable in a point that the safety is higher and the wettablility of the electrolyte is excellent. As the graphite are mentioned natural graphite, artificial graphite, mesophase carbon micro bead (MCMB) and so on, further mentioned graphitizable carbon and non-graphitizable carbon. These active materials for the negative electrode may be used alone or in a combination of two or more.

The positive electrode and the negative electrode may be mixed with an electrically conducting agent and a binding agent, if necessary. As the electrically conducting agent are mentioned acetylene black and the like, and as the binding agent are mentioned polyvinylidene fluoride (PVDF), polytetrafluoroethylene (PTFE), styrene-butadiene rubber (SBR), carboxymethyl cellulose (CMC) and the like. These additives may be compounded in the same compounding ratio as in the conventional case.

The forms of the positive and negative electrodes are not particularly limited, but can be properly selected from the well-known forms as the electrode. For example, there are mentioned a sheet form, a column form, a plate form, a spiral form and the like.

As the other member used in the non-aqueous electrolyte battery of the invention is mentioned a separator interposed between the positive and negative electrodes in the non-aqueous electrolyte battery and acting to prevent short-circuiting of current due to the contact between the electrodes. As a material of the separator are preferably mentioned materials capable of surely preventing the contact between the electrodes and passing or impregnating the electrolyte such as non-woven fabrics, thin-layer films and the like made of synthetic resin such as polytetrafluoroethylene, polypropylene, polyethylene, cellulose based resin, polybutylene terephthalate, polyethylene terephthalate or the like. Among them, a microporous film having a thickness of about 20-50 µm and made of polypropylene or polyethylene, and a film made of cellulose based resin, polybutylene terephthalate, polyethylene terephthalate or the like are particularly preferable. In the invention, various well-known members usually used in the battery can be preferably used in addition to the above-mentioned separator.

The form of the above non-aqueous electrolyte battery according to the invention is not particularly limited, but there are preferably mentioned various well-known forms such as coin type, button type, paper type, cylindrical type of polygonal form or spiral structure and so on. In case of the button type, the non-aqueous electrolyte battery can be made by preparing sheet-shaped positive and negative electrodes and sandwiching the separator between the positive and negative electrodes. Also, in case of the spiral structure, the non-aqueous electrolyte battery can be made by preparing a sheet-shaped positive electrode, sandwiching between collectors, piling the sheet-shaped negative electrode thereon and then winding them or the like.

EXAMPLES

The following examples are given in illustration of the invention and are not intended as limitations thereof.

Example 1

10% by volume of methoxy difluorophosphine oxide [$O=PF_2(OCH_3)$] and 90% by volume of mixed solution of ethylene carbonate (EC)/ethyl methyl carbonate (EMC) (volume ratio of EC/EMC=3/7) are mixed and then $LiPF_6$ is dissolved at a concentration of 1 mol/L to prepare a non-aqueous electrolyte. The limit oxygen index of the non-aqueous electrolyte thus obtained is measured by the following method (1) to obtain results shown in Table 1.

(1) Limit Oxygen Index of the Electrolyte

The limit oxygen index of the electrolyte is measured according to JIS K 7201. The larger the limit oxygen index, the more difficult the combustion of the electrolyte. Concretely, a test piece is prepared by reinforcing a $SiO_2$ sheet (quartz filter paper, incombustible) of 127 mm×12.7 mm with U-shaped aluminum foil into a self-supported state and impregnating the $SiO_2$ sheet with 1.0 mL of the electrolyte. The test piece is vertically attached to a test piece supporting member so as to position at a distance separated from an upper end portion of a combustion cylinder (inner diameter: 75 mm, height: 450 mm, equally filled with glass particles of 4 mm in diameter from a bottom to a thickness of 100±5 mm, and placed a metal net thereon) to not less than 100 mm. Then, oxygen (equal to or more than JIS K 1101) and nitrogen (equal to or more than grade 2 of JIS K 1107) are flown through the combustion cylinder and the test piece is ignited under a predetermined condition (heat source is Type 1, No. 1 of JIS K 2240) to examine combustion state. In this case, a total flow amount in the combustion cylinder is 11.4 L/min. This test is repeated three times, and an average value thereof is shown in Table 1. The oxygen index means a value of a minimum oxygen concentration required for maintaining combustion of a material and represented by a volume percentage. The limit oxygen index in the invention is calculated from minimum oxygen flow amount required for continuing the combustion of the test piece over 3 minutes or more or continuing the combustion after the firing so as to maintain the combustion length of not less than 50 mm and minimum nitrogen flow amount at this time according to the following equation:

Limit oxygen index=(Oxygen flow amount)/[(Oxygen flow amount)+(Nitrogen flow amount)]×100 (volume %)

Then, 94 parts by mass of $LiCoO_2$ (an active material for a positive electrode) is added with 3 parts by mass of acetylene black (electrically conducting agent) and 3 parts by mass of polyvinylidene fluoride (binding agent) and kneaded with an organic solvent (mixed solvent of 50/50 vol % of ethyl acetate and ethanol), and thereafter the kneaded mass is applied onto an aluminum foil having a thickness of 25 μm (collector) with a doctor blade and dried in hot air (100-120° C.) to prepare a positive electrode sheet having a thickness of 80 μm. Also, 90 parts by mass of artificial graphite (an active material for a negative electrode) is added with 10 parts by mass of polyvinylidene fluoride (binding agent) and kneaded with an organic solvent (mixed solvent of 50/50 vol % of ethyl acetate and ethanol), and thereafter the kneaded mass is applied onto a copper foil having a thickness of 25 μm (collector) with a doctor blade and dried in hot air (100-120° C.) to prepare a negative electrode sheet having a thickness of 80 μm. The negative electrode sheet is piled on the positive electrode sheet through a separator having a thickness of 25 μm (microporous film: made of polypropylene) and wound to prepare a cylinder type electrode. A length of the positive electrode in the cylinder type electrode is about 260 mm. The above-described electrolyte is poured into the cylinder type electrode and sealed to prepare a size AA lithium battery (non-aqueous electrolyte secondary battery). The cycle performance and the low-temperature characteristics of the thus obtained battery are measured by the following methods to obtain results shown in Table 1.

(2) Evaluation of the Cycle Performance of the Battery

The discharge-recharge of the battery are repeated 50 cycles in an atmosphere of 20° C. under conditions of upper limit voltage: 4.3 V, lower limit voltage: 3.0 V, discharge current: 50 mA and recharge current: 50 mA, and the capacity remaining ratio S is calculated from the initial discharge capacity and the discharge capacity after 50 cycles according to the following equation:

Capacity remaining ratio S=discharge capacity after 50 cycles/initial discharge capacity×100(%)

and is used as an indication of the cycle performance of the battery.

(3) Evaluation of the Low-Temperature Characteristics of the Battery (Measurement of the Low-Temperature Discharge Capacity Remaining Ratio)

The discharge-recharge of the battery are repeated 5 cycles in an atmosphere of 20° C. or −10° C. under conditions of upper limit voltage: 4.3 V, lower limit voltage: 3.0 V, discharge current: 50 mA and recharge current: 50 mA, the discharge capacities after 5 cycles at 20° C. and −10° C. are compared and the capacity remaining ratio L is calculated according to the following equation:

Capacity remaining ratio L=discharge capacity after 5 cycles (−10° C.)/discharge capacity after 5 cycles (20° C.)×100(%)

and is used as an indication of the low-temperature characteristics of the battery.

Example 2

A non-aqueous electrolyte is prepared in the same manner as in Example 1 except that 10% by volume of aminodifluorophosphine oxide $[O=PF_2NH_2]$ is used instead of methoxy difluorophosphine oxide and the limit oxygen index of the non-aqueous electrolyte thus obtained is measured. Moreover, the non-aqueous electrolyte secondary battery is made in the same manner as in Example 1, and the cycle performance and the low-temperature characteristics are evaluated, respectively. The results are shown in Table 1.

Example 3

A non-aqueous electrolyte is prepared in the same manner as in Example 1 except that 10% by volume of diaminofluorophosphine oxide $[O=PF(NH_2)_2]$ is used instead of methoxy difluorophosphine oxide and the limit oxygen index of the non-aqueous electrolyte thus obtained is measured. Moreover, the non-aqueous electrolyte secondary battery is made in the same manner as in Example 1, and the cycle performance and the low-temperature characteristics are evaluated, respectively. The results are shown in Table 1.

Comparative Example 1

A non-aqueous electrolyte is prepared in the same manner as in Example 1 except that 10% by volume of trimethyl phosphate is used instead of methoxy difluorophosphine oxide and the limit oxygen index of the non-aqueous electrolyte thus obtained is measured. Moreover, the non-aqueous electrolyte secondary battery is made in the same manner as in Example 1, and the cycle performance and the low-temperature characteristics are evaluated, respectively. The results are shown in Table 1.

TABLE 1

|  | Additive used | Limit oxygen index (vol %) | Cycle performance Capacity remaining ratio S (%) | Low-temperature characteristics Capacity remaining ratio L (%) |
|---|---|---|---|---|
| Example 1 | $O=PF_2(OCH_3)$ | 24.1 | 98 | 75 |
| Example 2 | $O=PF_2NH_2$ | 25.6 | 94 | 76 |
| Example 3 | $O=PF(NH_2)_2$ | 23.4 | 95 | 73 |
| Comparative Example 1 | $O=P(OCH_3)_3$ | 19.5 | 73 | 63 |

As shown in Table 1, it is confirmed that the limit oxygen index of the non-aqueous electrolyte can be improved by adding the phosphine oxide compound having P—F bond and/or P—$NH_2$ bond in its molecule to the electrolyte, and as a result the safety of the non-aqueous electrolyte can be improved.

The invention claimed is:

1. A non-aqueous electrolyte for a battery comprising a phosphine oxide compound having P—$NH_2$ bond in its molecule and a support salt.

2. A non-aqueous electrolyte for a battery according to claim 1, wherein a content of the phosphine oxide compound is not less than 3% by volume.

3. A non-aqueous electrolyte for a battery according to claim 2, wherein the content of the phosphine oxide compound is not less than 5% by volume.

4. A non-aqueous electrolyte for a battery according to claim 1, wherein the phosphine oxide compound is represented by the following formula (I):

$$O=PR^1_3 \quad (I)$$

wherein $R^1$s are independently a monovalent substituent or a halogen element, provided that at least one of $R^1$s is amino group).

5. A non-aqueous electrolyte for a battery according to claim 4, wherein $R^1$s in the formula (I) are independently selected from the group consisting of fluorine, an amino group, an alkyl group and an alkoxy group, and at least one of $R^1$s is amino group.

6. A non-aqueous electrolyte for a battery according to claim 5, wherein at least one of $R^1$s in the formula (I) is fluorine and at least one of $R^1$s in the formula (I) is amino group.

7. A non-aqueous electrolyte for a battery according to claim 5, wherein $R^1$s in the formula (I) are independently fluorine or amino groups, and at least one of $R^1$s is amino group.

8. A non-aqueous electrolyte for a battery according to claim 1, which further contains an aprotic organic solvent.

9. A non-aqueous electrolyte for a battery according to claim 8, wherein the aprotic organic solvent comprises a cyclic or chain ester compound or a chain ether compound.

10. A non-aqueous electrolyte battery comprising a non-aqueous electrolyte for a battery as claimed in any one of claims 1-9, a positive electrode and a negative electrode.

\* \* \* \* \*